Jan. 26, 1971 W. HODES 3,557,436
METHOD OF MAKING ANIMATED MANIPULATIVE TOY
Filed Sept. 24, 1968 3 Sheets-Sheet 1
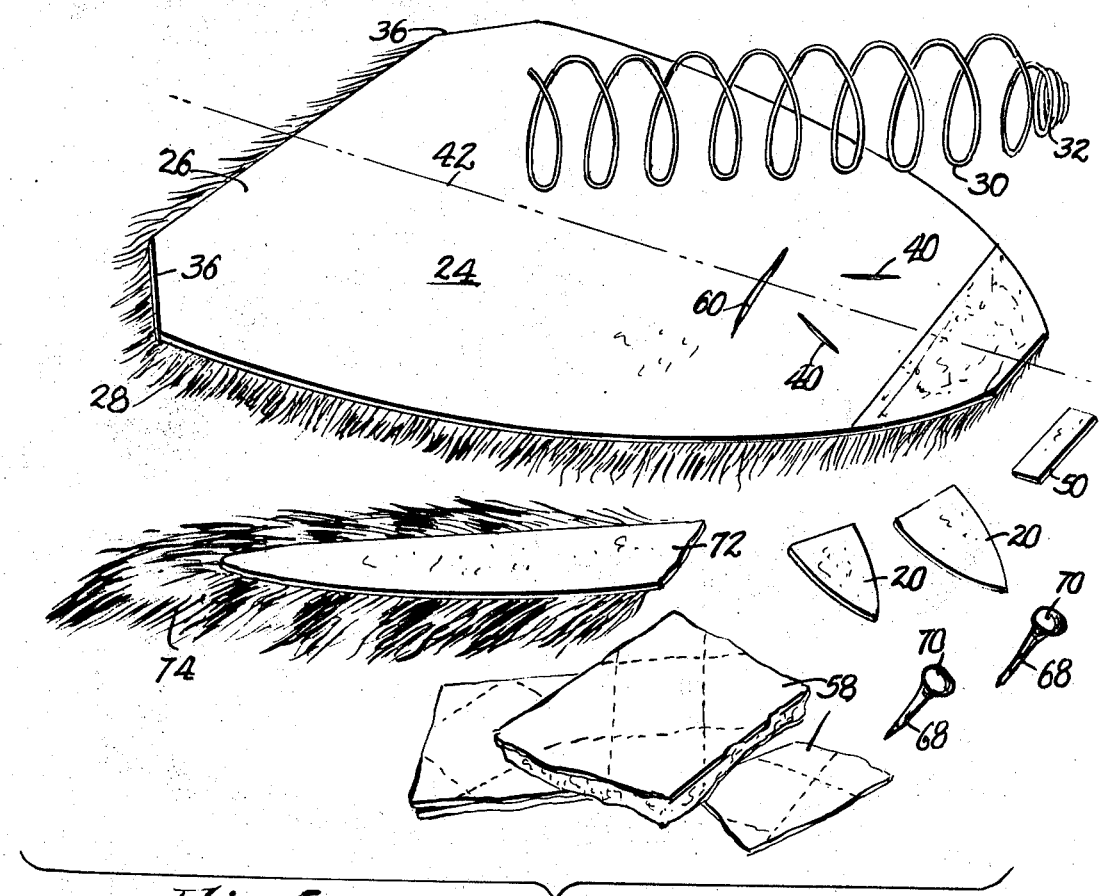
INVENTOR
William Hodes
BY Polachek & Saulsbury
ATTORNEYS

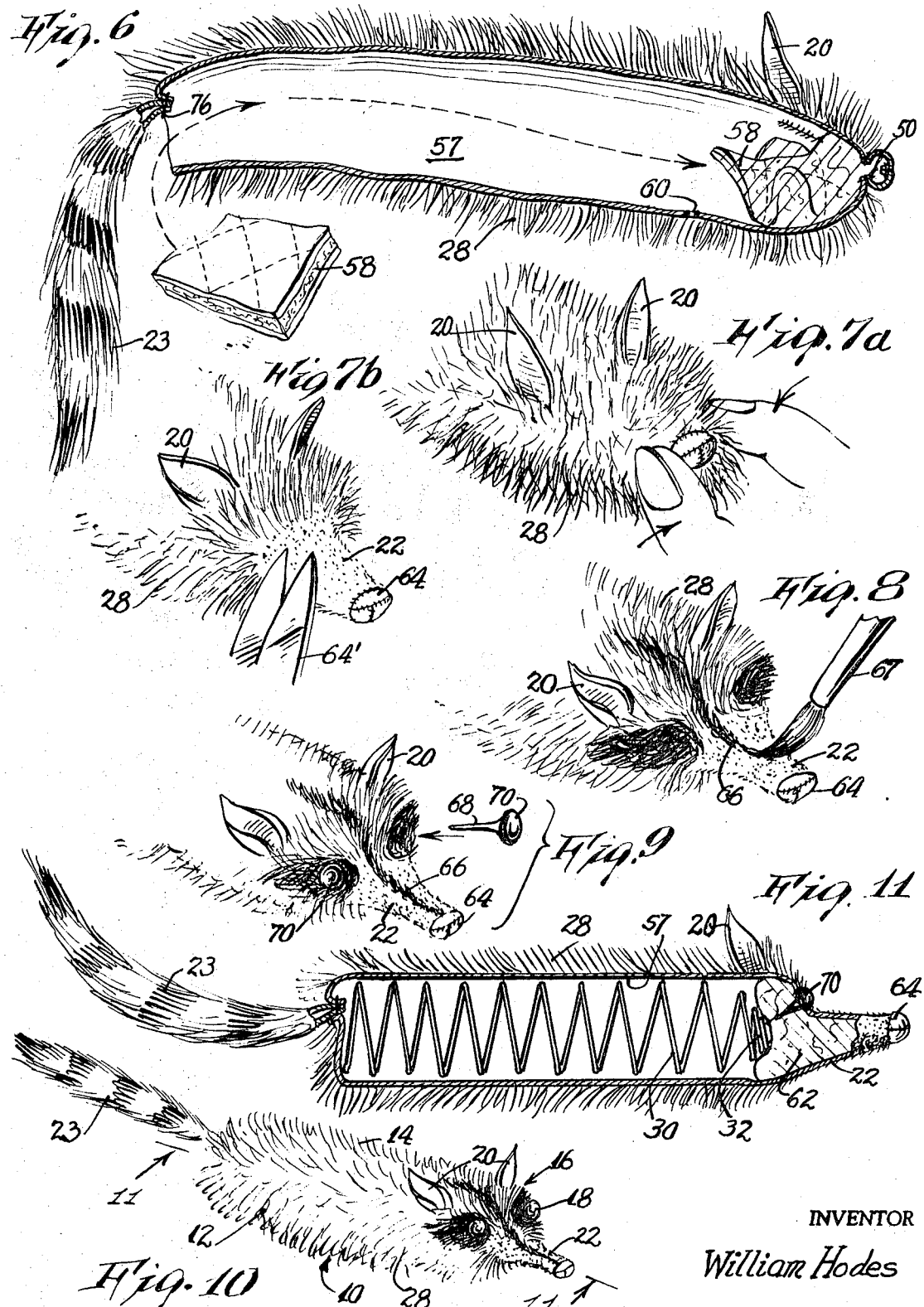

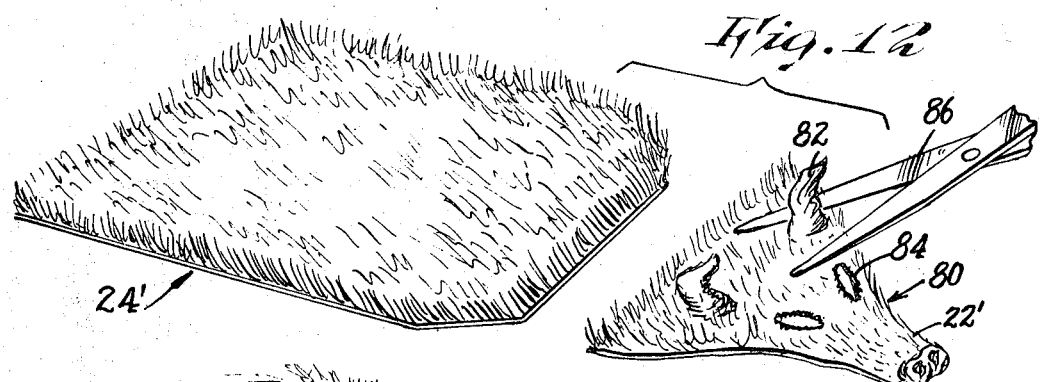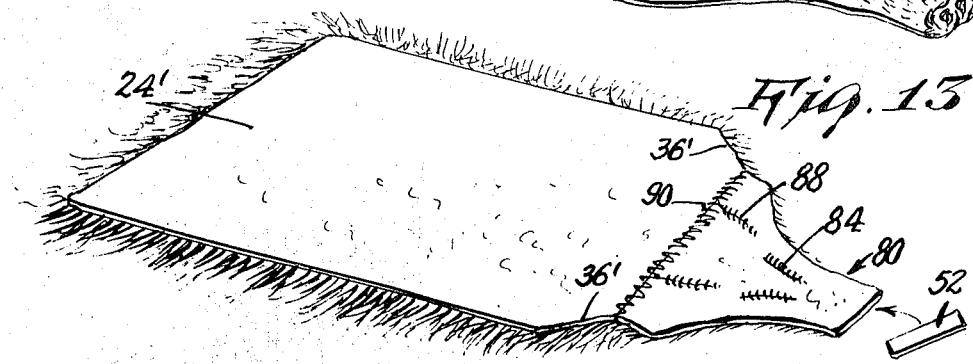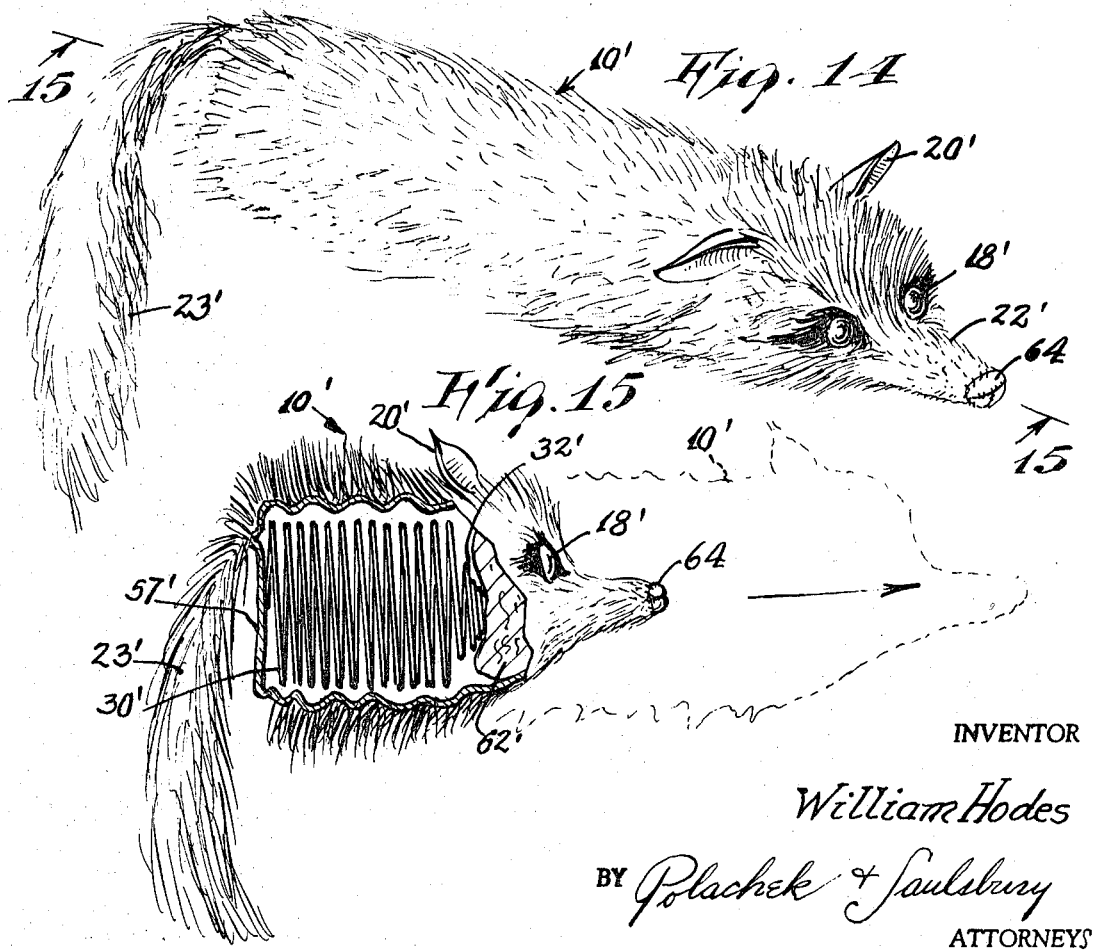

United States Patent Office 3,557,436
Patented Jan. 26, 1971

3,557,436
METHOD OF MAKING ANIMATED MANIPULATIVE TOY
William Hodes, 244 W. 27th St., New York, N.Y. 10001
Filed Sept. 24, 1968, Ser. No. 761,977
Int. Cl. B23p 19/00
U.S. Cl. 29—428        8 Claims

ABSTRACT OF THE DISCLOSURE

The method of manufacturing an animated toy animal. The method consists of taking a suitably shaped pelt body and forming slits therein constituting ear sockets; folding the pelt body longitudinally upon itself to form a tubular cover for an elastic coiled wire, constituting the body of the animal; stuffing one end of the tubular cover to shape the head of the animal; inserting fabric ears in the head, embedding eyes in the head and attaching a tail at the other end of the cover.

---

This invention relates to the method of making an animated animal toy and the product thereof.

An object of the present invention is to provide a novel method of making an animated toy animal having an elongated tubular body, for example, such as a racoon or the like, capable of simulating the natural movements in locomotion of the animal.

The body of the animal is formed of a coil or helix of thin elastic wire covered with skin of the animal being imitated, with the tail attached thereto. The head of the animal is formed from the skin of the head of the animal being imitated without the ears, eyes and nose and manually shaping and stuffing the head and manually applying ears, eyes and snout.

FIG. 1 is a spread perspective view of the parts used to make the animated toy.

FIG. 2 is a fragmentary perspective view of a step in the manufacture showing the ears placed in position.

FIG. 3 is a perspective view showing another step of shaping the skin of the body by folding along the center line 3—3 of FIG. 1 and sewing the edges together.

FIG. 4 is a plan view of the tail of the animal preparatory to attachment to the body.

FIG. 5 is a cross-sectional view taken on the plane of the line 5—5 of FIG. 4.

FIG. 6 is a part sectional and part perspective view showing the manner of stuffing the head to shape it.

FIGS. 7A and 7B are perspective views showing, respectively, the step of securing a nostril-like disc to the snout and the step of trimming the snout of the animal with a pair of scissors.

FIG. 8 is a perspective view showing the step of staining the head and snout to simulate the head and snout of an animal.

FIG. 9 is a similar view showing the step of applying the eyes to the head of the animal.

FIG. 10 is a perspective view of the completed toy animal.

FIG. 11 is an enlarged sectional view thereof taken on the line 11—11 of FIG. 10.

FIG. 12 is a top spread perspective view similar to FIG. 1 showing some of the parts of a slightly different animal from that shown in FIG. 10, the natural head being shown separated from the natural body and the ears thereof about to be cut off.

FIG. 13 is a bottom perspective view of the head and body of FIG. 12 being secured together by stitching, and a nose in position for attachment to the head.

FIG. 14 is a top perspective view of the completed animal.

FIG. 15 is a side elevational view of the animal of FIG. 14 shown in collapsed condition, parts being shown broken away to show the interior thereof, the animal being shown in normal extended position in dash lines.

Referring now in detail to the drawings, in FIG. 10 an animated toy animal made in accordance with the present invention is shown and indicated generally at 10. The animal is in simulation of a racoon type of animal, having an elongated tubular form of the body 12 with fur 14 thereon and having a head 16 with eyes 18, ears 20 and snout 22 and tail 23.

The animal 10 is manufactured from the various parts shown in FIG. 1. A pelt body 24 of animal skin 26 and fur 28 thereon serves as a cover for a helical or coiled spring 30 which serves as the body of the animal. The spring is formed of elastic lightweight wire. At one end, the convolutions thereof are made smaller and closer forming a nozzle 32. The pelt body 24 tapers from end to end, the narrow end being formed with a pair of spaced slits serving as ear sockets 34. At the wide end of the pelt body, the corners are cut at a slant as indicated at 36.

The first step in the manufacture is to cut a pair of slits forming ear sockets 40. The next step is to fold the pelt 24 longitudinally along its center line as indicated by the line 42, with the fur positioned on the inside. The long folded edges are stitched to each other by a row of stitching 44, the slanting corners are stitched to each other by a row of stitching 46 and the edges of the narrow end are stitched to each other by a row of stitching 48. A felt strip 50 is next folded upon itself stitched along its edges by stitching 52 and then stitched to the narrow end by means of stitching 48. A portion of the wide end of the pelt body is left unattached as indicated at 54. This permits the tubular cover as shown in FIG. 3 to be turned inside out bringing the fur surface to the outside. Fabric ears 20 are then inserted through the ear sockets 40 and stitched in place by stitching 56. The narrow end of the tubular cover 57 is then stuffed by inserting strips 58 of cotton batting through the open end of the wide end of the cover as shown in FIG. 6, forcing said cotton batting to the narrow end. and by means of the finger of the operator, extending through an opening 60, in the pelt body behind the ears 20, compacting said cotton batting as indicated at 62 in FIG. 11, thereby shaping the head and forming the snout 22. The snout 22 is next trimmed of fur by means of a pair of shears 64. A disc of fabric material 64 is next secured to the extremity of the snout by adhesive or the like, simulating the nostrils of the snout. A dark colored linear mark 66 is next painted along the fur 28 between the ears 20 and along the snout 22, by a brush 67, and the fur is marked with the dark color at the positions of the eyes in front of the ears 20. Pins 68 with darkened glass heads 70 are inserted through the darkened portions of the fur, through the cover 57 and into the stuffing material 62 to simulate eyes. The coiled wire body 30 is next inserted through the open end of the wide end of the cover and its nozzle 32 embedded in the stuffing material 62 at the narrow end of the cover as shown in FIG. 11. The pelt strip 72 with fur 74 shown in FIG. 1 is then folded or curled longitudinally to form the tubular tail 23. Finally, the end of the tail is secured to the open end of the wide end of the cover by means of stitching 76, thereby providing a toy animal of the racoon type as shown in FIG. 10 at 10.

An animated toy animal in the form of a fox 10' is shown in FIG. 14 formed from parts shown in FIG. 12 and some of the parts shown in FIG. 1. In FIG. 12, a rectangular pelt body 24' with slanting corners 36' at one end, and a substantially triangular shaped pelt body 80 are shown. The pelt body 24' serves as the cover similar to cover 57 for a coiled spring body 30', the pelt body is the head of an animal such as a fox and bears a pair of natural ears 82, 82 and eye sockets 84, 84 and a snout 22'.

The natural ears 82, 82 are first cut off by means of shears 86 and ear sockets 88 are substituted therefor. The pelt body 80 is next stitched to the slanted cornered end of the pelt body 24' by a row of stitching 90. The connected pelt bodies are next curled upon themselves and stitched along the long edges thereof forming a cover similarly to the cover 57. Fabric ears 20' are inserted through the ear sockets 88 and stitched in position. Cotton batting 62' is then stuffed into the head and snout of the fox like animal. The coiled spring 30' is then inserted through the open end of the cover 57' with its nozzle end 32' embedded in the stuffing material in the head. Beaded eyes 18' are next embedded in the covering and stuffing material 62'. A tail 23' similar in construction to tail 23 is finally stitched to the open end of the cover 57'.

In using the toy animals 10 or 10' the animal is held in the right hand. The middle and index fingers of the right hand are positioned just under the head of the animal and hidden from view. The body is gripped tightly with the remaining fingers of the right hand. Next the spring is compressed with the middle and index fingers alternately and repeatedly so that the head of the animal moves right and left continuously.

Another use for the toy animal is when holding the body of the animal as aforesaid, the body of the animal is brought close to the body of the operator and the back of the body of the animal is stroked with the left hand while the head of the animal is moving, which makes the animal appear very much alive.

Still another manner of use of the toy animal is to bring the palm of the left hand under the head of the animal and continue with the head movements. This gives the effect of the animal eating out of the hand.

A further manner of use of the animal is to rest the animal along the right arm and hold close the body about chest high. The left arm is then crossed over the right so that the fingers of the left hand grip the tail. The right hand is now able to move the head and the left hand flip the tail at the same time.

A further manner of use of the toy animal is to place the palm of the left hand under the central part of the body and place the thumb thereof on the top thereof. The top animal is now held near the waistline of the operator with the stripes 66 of the animal 10 facing the viewers. The tail covers the back of the left hand of the operator. The right hand now compresses the spring at the head down slowly with a stroking movement and at the same time grips the side of the head with the thumb of the left hand and pulls down, thus giving the effect of the animal turning its head to the left side. Control is kept of the compressed body with the fingers of the right hand and the coiled spring is then released, at the same time the opposite side of the head is gripped with the right thumb, thus giving the effect of the animal turning its head to the right. The coiled spring is compressed again and gradually released, and at the same time the body is pushed upwardly with the left hand under cover of the tail, the thumb movements are repeated and stroking is continued. At the same time, the animal is kept pushing upwardly until the shoulder of the operator is reached, then when the head of the animal is close to the head of the operator, the head of the animal is pulled down with the forefinger of the right hand. This gives the effect that the animal is attempting to kiss the operator.

While I have illustrated and described the preferred embodiments of my invention it is to be understood that I do not limit myself to the precise construction herein disclosed and that various changes and modifications may be made within the scope of the invention as defined in the appended claims.

I claim:
1. The method of manufacturing a toy animal consisting of the steps of processing a substantially triangular pelt body by slitting a pair of ear sockets therein, adjacent the apical end of the pelt body, slitting a finger opening adjacent the ear sockets, curling the pelt body upon itself with the fur on the inside forming a tubular cover, securing the long edges and narrow end of the cover by stitching, leaving one end open, turning the cover inside out bringing the fur to the outside thereof, inserting fabric ears in the ear sockets, stuffing the narrow end of the cover to shape the head of the animal and forming a snout, embedding beaded eyes in the shaped head inwardly of the snout, inserting a coiled spring through the open end of the cover to form a resilient body enveloped by the cover, and sewing a tail to the open end of the cover.

2. The method of manufacturing a toy animal as defined in claim 1 wherein the coiled spring body has a nozzle at one end, and embedding the nozzle in the stuffing material at the narrow end of the cover.

3. The method of manufacturing a toy animal as defined in claim 1 and pasting a fabric disc on the end of the snout in imitation of the nostrils of the snout.

4. The method of manufacturing a toy animal as defined in claim 1 and painting a narrow stripe along the top of the head between the ears and along the snout in simulation of the stripe of a racoon type of animal.

5. The method of manufacturing a toy animal as defined in claim 1, wherein the stuffing material is inserted through an opening in the cover at the side end thereof, forcing the stuffing material to the narrow end and compacting the stuffing material by the finger of the operator, inserted through an opening in the cover.

6. The method of manufacturing a toy animal as defined in claim 1, wherein the coiled spring body has a nozzle at one end thereof, and embedding the nozzle in the stuffing material at the narrow end of the cover, and pasting a fabric disc on the end of the snout in imitation of the nostrils of the snout.

7. The method of manufacturing a toy animal as defined in claim 6 and painting a narrow stripe along the top of the head between the ears and along the snout in simulation of the stripe of a raccoon type of animal.

8. The method of manufacturing a toy animal as defined in claim 1 wherein the pelt body includes a rectangular pelt body and a substantialy triangular pelt body, the triangular pelt body representing the head of a fox-like animal having natural ears, the steps of sewing the triangular shaped pelt body to the rectangular shaped pelt body, cutting off the natural ears, and slitting a pair of eye sockets in the triangular shaped pelt body to receive the beaded eyes.

References Cited
UNITED STATES PATENTS

| | | | |
|---|---|---|---|
| 1,206,483 | 11/1916 | Stokes | 46—158 |
| 1,276,224 | 8/1918 | Isaacs | 46—160X |
| 1,478,348 | 12/1923 | Meyers | 46—158 |
| 1,736,687 | 11/1929 | Woolnough | 46—160 |
| 2,666,953 | 1/1954 | Andrews | 29—428 |
| 3,032,922 | 5/1962 | Mitchell | 46—160X |
| 3,163,418 | 12/1964 | Meyers | 46—160X |
| 3,210,888 | 10/1965 | Lancaster | 29—428X |
| 3,445,917 | 5/1969 | Adler | 46—158X |

CHARLIE T. MOON, Primary Examiner

U.S. Cl. X.R.

46—158